(12) United States Patent
Wakayama et al.

(10) Patent No.: US 11,415,970 B2
(45) Date of Patent: Aug. 16, 2022

(54) CONTROL PLANNING DEVICE, CONTROL PLANNING SYSTEM, CONTROL PLANNING METHOD, AND RECORDING MEDIUM

(71) Applicant: NEC CORPORATION, Tokyo (JP)

(72) Inventors: Hisaya Wakayama, Tokyo (JP); Masatsugu Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/978,451

(22) PCT Filed: Mar. 9, 2018

(86) PCT No.: PCT/JP2018/009233
§ 371 (c)(1),
(2) Date: Sep. 4, 2020

(87) PCT Pub. No.: WO2019/171579
PCT Pub. Date: Sep. 12, 2019

(65) Prior Publication Data
US 2021/0041858 A1 Feb. 11, 2021

(51) Int. Cl.
*G05B 19/418* (2006.01)
(52) U.S. Cl.
CPC ... *G05B 19/41865* (2013.01); *G05B 19/4183* (2013.01); *G05B 19/41805* (2013.01); *G05B 19/41885* (2013.01)
(58) Field of Classification Search
CPC ........ G05B 19/41865; G05B 19/41805; G05B 19/4183; G05B 19/41885;
(Continued)

(56) References Cited

U.S. PATENT DOCUMENTS 5,140,537 A * 8/1992 Tullis ............... G05B 19/41885
703/6
5,216,593 A * 6/1993 Dietrich ............. G06Q 10/0875
345/467
(Continued)

FOREIGN PATENT DOCUMENTS

JP H06-28378 A 2/1994
JP 10-235541 A 9/1998
(Continued)

OTHER PUBLICATIONS

International search report for PCT/JP2018/009233 dated May 29, 2018.
(Continued)

*Primary Examiner* — Christopher E. Everett

(57) ABSTRACT

An evaluation target period acquiring unit acquires an evaluation target period based on an evaluation timing included by evaluation index information that includes at least an evaluation index to be evaluated and the evaluation timing of the evaluation index. A control target extracting unit extracts a control target whose control timing is included in the evaluation target period as a first control target from control target information that includes at least the control target to be the target of a control plan in an operation and the control timing of each control target. A control planning unit calculates the control plan maximizing the evaluation index with the first control target as a variable and state information that is information necessary for calculation of a control achievement at a time of planning and the control plan, as a constraint condition.

20 Claims, 15 Drawing Sheets

(58) Field of Classification Search
CPC ........... G05B 2219/32297; G05B 2219/32083; Y02P 90/02
See application file for complete search history.

(56) References Cited

U.S. PATENT DOCUMENTS

| | | | | |
|---|---|---|---|---|
| 6,430,454 | B1* | 8/2002 | Vasko | G06Q 10/06 |
| | | | | 700/100 |
| 6,459,946 | B1* | 10/2002 | Villanova | G05B 19/41865 |
| | | | | 700/111 |
| 2004/0107133 | A1* | 6/2004 | Pantaleo | G06Q 10/10 |
| | | | | 705/7.13 |

FOREIGN PATENT DOCUMENTS

| | | |
|---|---|---|
| JP | 2014-081778 A | 5/2014 |
| JP | 2014-123227 A | 7/2014 |

OTHER PUBLICATIONS

Japanese Office Action for JP Application No. 2020-504623 dated Nov. 30, 2021 with English Translation.

\* cited by examiner

FIG. 7

| CONTROL TARGET | CONTROL TIMING |
|---|---|
| PRODUCTION ASSIGNMENT CHANGE | EVERY TEN MINUTES |
| WORKER ASSIGNMENT CHANGE | EVERY HOUR |
| PART PROCUREMENT | DAILY |
|  |  |

FIG. 8

| EVALUATION INDEX | EVALUATION TIMING |
|---|---|
| WORK PROGRESS RATE | EVERY HOUR |
| PRODUCTION COSTS | DAILY |
| NUMBER OF REMAINING INVENTORY | WEEKLY |
| PROCUREMENT COSTS | WEEKLY |

FIG. 9

| CELL | UPDATE TIME | SUBSEQUENT PROCESS | ALLOCATION RATE | NUMBER OF WORKERS | NUMBER OF ASSIGNED WORKS | NUMBER OF COMPLETED WORKS | PROGRESS RATE OF WORK | PLANNED PROGRESS RATE | REMAINING BUFFER | NUMBER OF COMPLETED WORKS IN MOST RECENT 1 HOUR | NUMBER OF COMPLETED WORKS IN MOST RECENT 15 MINUTES |
|---|---|---|---|---|---|---|---|---|---|---|---|
| A | 13:00 | B1 | 50% | 8 | 300 | 200 | 67% | 60% | 100 | 40 | 15 |
|   |       | B2 | 50% |   |     |     |     |     |     |    |    |
| B1 | 13:00 | C1 | 100% | 3 | 150 | 90 | 60% | 50% | 10 | 25 | 8 |
|   |       | C2 | 0% |   |     |    |     |     |    |    |   |
| B2 | 13:00 | C1 | 0% | 4 | 150 | 70 | 47% | 50% | 30 | 15 | 3 |
|   |       | C2 | 100% |   |     |    |     |     |    |    |   |
| C1 | 13:00 | - | - | 6 | 150 | 80 | 53% | 40% | 10 | 20 | 5 |
| C2 | 13:00 | - | - | 6 | 150 | 65 | 43% | 40% | 5 | 20 | 5 |

FIG. 11

| CELL | NUMBER OF ASSIGNED WORKS | NUMBER OF ALREADY ASSIGNED WORKS | PLANNED PROGRESS RATE (14:00) | NUMBER OF ESTIMATED COMPLETED WORKS (14:00) | ESTIMATED WORK PROGRESS RATE BEFORE CONTROL (14:00) | NUMBER OF ASSIGNED WORKS AFTER CONTROL | ESTIMATED WORK PROGRESS RATE AFTER CONTROL (14:00) |
|---|---|---|---|---|---|---|---|
| A | 300 | 300 | 75% | 240 | 80% | 300 | 80% |
| B1 | 150 | 100 | 65% | 115 | 77% | 170 | 68% |
| B2 | 150 | 100 | 65% | 85 | <u>57%</u> | 130 | 65% |
| C1 | 150 | 90 | 55% | 100 | 67% | 170 | 58% |
| C2 | 150 | 70 | 55% | 85 | 57% | 130 | 65% |

FIG. 12

| CELL | UPDATE TIME | SUBSEQUENT PROCESS | ALLOCATION | NUMBER OF WORKERS | NUMBER OF ASSIGNED WORKS | ... |
|---|---|---|---|---|---|---|
| A | 13:00 | B1 | 70% | 8 | 300 | ... |
|   |   | B2 | 30% |   |   |   |
| B1 | 13:00 | C1 | 100% | 3 | 170 | ... |
|   |   | C2 | 0% |   |   |   |
| B2 | 13:00 | C1 | 0% | 4 | 130 | ... |
|   |   | C2 | 100% |   |   |   |
| C1 | 13:00 | - | - | 6 | 170 | ... |
| C2 | 13:00 | - | - | 6 | 130 | ... |

CONTROL PLANNING DEVICE, CONTROL PLANNING SYSTEM, CONTROL PLANNING METHOD, AND RECORDING MEDIUM

CROSS-REFERENCE TO RELATED APPLICATIONS

This application is a National Stage of International Application No. PCT/JP2018/009233 filed Mar. 9, 2018.

TECHNICAL FIELD

The present invention relates to a control planning device, a control planning method, a control planning method and a recording medium for formulating a work plan so as to improve an evaluation index in a task such as manufacturing, assembling, processing, delivering, picking, allocating, or carrying out.

BACKGROUND ART

In most of the tasks relating to a supply chain, such as manufacturing, assembling, processing, delivering, picking, allocating, and carrying out, a resource management system has been introduced. A resource management system is a system which calculates and inputs a work plan and acquires the progress status of each task through a barcode or a wireless tag in addition to data input/output from/to another system. Introduction of a resource management system enables a task manager to check the progress of a task. Examples of a resource management system are ERP (Enterprise Resource Planning), SCP (Supply Chain Planning), SCE (Supply Chain Execution), WMS (Warehouse Management System), and TMS (Transport Management System).

Some resource management system may include a control planning system that calculates a work plan. In one aspect of a work plan calculation process in a control planning system, a work plan simulation is trialed multiple times, and a set of variables with which an evaluation index such as cost is the most favorable is calculated as a work plan. Because trialing the simulation requires a calculation time, calculation of a work plan, particularly, recalculation of a work plan is focused on, and efforts so as to reduce a recalculation time is being made. For example, Patent Document 1 discloses a production scheduler that is capable of determining a lot on which recalculation of the input time should be performed based on the difference between the end time of the final process and the delivery time of each lot obtained from the result of simulation, and thereby restricting a lot on which the recalculation should be performed in simulation and reducing a calculation time.

Further, as a technique related to the present invention, for example, Patent Document 2 proposes a scheduling device that uses the degree of difference from the latest plan as an evaluation index and formulates a correction plan with the smallest degree of difference.

Patent Document 1: Japanese Unexamined Patent Application Publication No. JP-A 2014-123227
Patent Document 2: Japanese Unexamined Patent Application Publication No. JP-A 2014-081778

Evaluation indexes in work planning have their own unique timings of evaluation, and the frequencies thereof differ widely. For example, in general, the progress of production is evaluated at the frequency of minutes to tens of minutes, while the amount of inventory is evaluated on the daily to monthly basis.

Therefore, it can also be expected in recalculation of a work plan that a recalculation time is reduced by limiting a recalculation target in accordance with the evaluation timing of an evaluation index to be improved. However, Patent Document 1 and Patent Document 2 do not disclose a configuration/operation for limiting a recalculation target in accordance with the evaluation timing of an evaluation index.

SUMMARY

The present invention has been made to solve the abovementioned problem. An object of the present invention is to provide a control planning device, a control planning system, a control planning method and a recording medium that make it possible to reduce a time for calculation of a work plan.

A control planning device according to the present invention to solve the abovementioned problem includes: an evaluation target period acquiring unit configured to acquire an evaluation target period based on an evaluation timing included by evaluation index information, the evaluation index information including at least an evaluation index to be evaluated and the evaluation timing of the evaluation index; a control target extracting unit configured to extract a control target whose control timing is included in the evaluation target period as a first control target from control target information, the control target information including at least the control target to be a target of a control plan in an operation and the control timing of each of the control target; and a control planning unit configured to calculate the control plan that maximizes the evaluation index by using the first control target as a variable and using state information as a constraint condition, the state information being information necessary for calculation of a control achievement at a time of planning and the control plan.

Further, the present invention to solve the abovementioned problem is a control planning device calculating a control plan in an operation. The control planning device includes: a control target acquiring unit configured to acquire control target information including at least a control target to be a target of the control plan and a control timing of each of the control target; a state information acquiring unit configured to acquire state information that is information necessary for calculation of a control achievement at a time of planning and the control plan; an evaluation index acquiring unit configured to acquire evaluation index information including at least an evaluation index to be evaluated and an evaluation timing of the evaluation index; an evaluation target period acquiring unit configured to acquire an evaluation target period based on the evaluation timing included by the evaluation index information; a control target extracting unit configured to extract the control target whose control timing is included in the evaluation target period as a first control target; and a control planning unit configured to calculate the control plan that maximizes the evaluation index by using the first control target as a variable and using the state information as a constraint condition.

Further, a control planning system according to the present invention to solve the abovementioned problem includes: an evaluation target period acquiring unit configured to acquire an evaluation target period based on an evaluation timing included by evaluation index information, the evaluation index information including at least an evaluation index to be evaluated and the evaluation timing of the evaluation index; a control target extracting unit configured to extract a control target whose control timing is included in the evaluation target period as a first control target from control target information, the control target information including at least the control target to be a target of a control plan in an operation and the control timing of each of the control target; and a control planning unit configured to calculate the control plan that maximizes the evaluation index by using the first control target as a variable and using state information as a constraint condition, the state information being information necessary for calculation of a control achievement at a time of planning and the control plan.

Further, the present invention to solve the abovementioned problem is a control planning system calculating a control plan in an operation. The control planning system includes: a control target acquiring unit configured to acquire control target information including at least a control target to be a target of the control plan and a control timing of each of the control target; a state information acquiring unit configured to acquire state information that is information necessary for calculation of a control achievement at a time of planning and the control plan; an evaluation index acquiring unit configured to acquire evaluation index information including at least an evaluation index to be evaluated and an evaluation timing of the evaluation index; an evaluation target period acquiring unit configured to acquire an evaluation target period based on the evaluation timing included by the evaluation index information; a control target extracting unit configured to extract the control target whose control timing is included in the evaluation target period as a first control target; and a control planning unit configured to calculate the control plan that maximizes the evaluation index by using the first control target as a variable and using the state information as a constraint condition.

Further, a control planning method according to the present invention to solve the abovementioned problem includes: acquiring an evaluation target period based on an evaluation timing included by evaluation index information, the evaluation index information including at least an evaluation index to be evaluated and the evaluation timing of the evaluation index; extracting a control target whose control timing is included in the evaluation target period as a first control target from control target information, the control target information including at least the control target to be a target of a control plan in an operation and the control timing of each of the control target; and calculating the control plan that maximizes the evaluation index by using the first control target as a variable and using state information as a constraint condition, the state information being information necessary for calculation of a control achievement at a time of planning and the control plan.

Further, the present invention to solve the abovementioned problem is a control planning method for calculating a control plan in an operation. The control planning method includes: acquiring control target information including at least a control target to be a target of the control plan and a control timing of each of the control target; acquiring state information that is information necessary for calculation of a control achievement at a time of planning and the control plan; acquiring evaluation index information including at least an evaluation index to be evaluated and an evaluation timing of the evaluation index; acquiring an evaluation target period based on the evaluation timing included by the evaluation index information; extracting the control target whose control timing is included in the evaluation target period as a first control target; and calculating the control plan that maximizes the evaluation index by using the first control target as a variable and using the state information as a constraint condition.

Further, a non-transitory computer-readable recording medium according to the present invention to solve the abovementioned problem has a program recorded thereon. The program includes instructions for causing a computer to function as: an evaluation target period acquiring unit configured to acquire an evaluation target period based on an evaluation timing included by evaluation index information, the evaluation index information including at least an evaluation index to be evaluated and the evaluation timing of the evaluation index; a control target extracting unit configured to extract a control target whose control timing is included in the evaluation target period as a first control target from control target information, the control target information including at least the control target to be a target of a control plan in an operation and the control timing of each of the control target; and a control planning unit configured to calculate the control plan that maximizes the evaluation index by using the first control target as a variable and using state information as a constraint condition, the state information being information necessary for calculation of a control achievement at a time of planning and the control plan.

Further, the present invention to solve the abovementioned problem has a control planning program for calculating a control plan in an operation stored thereon. The control planning program includes instructions for causing a computer to execute: a control target acquiring process to acquire control target information including at least a control target to be a target of the control plan and a control timing of each of the control target; a state information acquiring process to acquire state information that is information necessary for calculation of a control achievement at a time of planning and the control plan; an evaluation index acquiring process to acquire evaluation index information including at least an evaluation index to be evaluated and an evaluation timing of the evaluation index; an evaluation target period acquiring process to acquire an evaluation target period based on the evaluation timing included by the evaluation index information; a control target extracting process to extract the control target whose control timing is included in the evaluation target period as a first control target; and a control planning process to calculate the control plan that maximizes the evaluation index by using the first control target as a variable and using the state information as a constraint condition.

With the configurations and operations, the present invention makes it possible to reduce a calculation time required for formulating a control plan.

BRIEF DESCRIPTION OF DRAWINGS

FIG. 7 is a view showing an example of storage information in a control target information storage unit 17 in the second example embodiment;

FIG. 8 is a view showing an example of storage information in an evaluation index information storage unit 18 in the second example embodiment;

FIG. 9 is a view showing an example of state information of each cell 2 in the second example embodiment;

FIG. 11 is a view describing a method for deriving a control plan in the second example embodiment;

FIG. 12 is a view showing an example of state information after control planning in the second example embodiment;

EXAMPLE EMBODIMENTS

Specific example embodiments of the present invention will be described below using the drawings. Meanwhile, the drawings and specific configurations used in the example embodiments should not be used for interpretation of the invention. That is to say, a control planning device, a control planning system, a control planning method and a control planning program according to the present invention are not limited to the following example embodiments, and various changes and modifications are possible within the scope of the claims.

First Example Embodiment

The configuration and operation of a control planning device in a first example embodiment of the present invention will be described below using the drawings.

Figure 1:
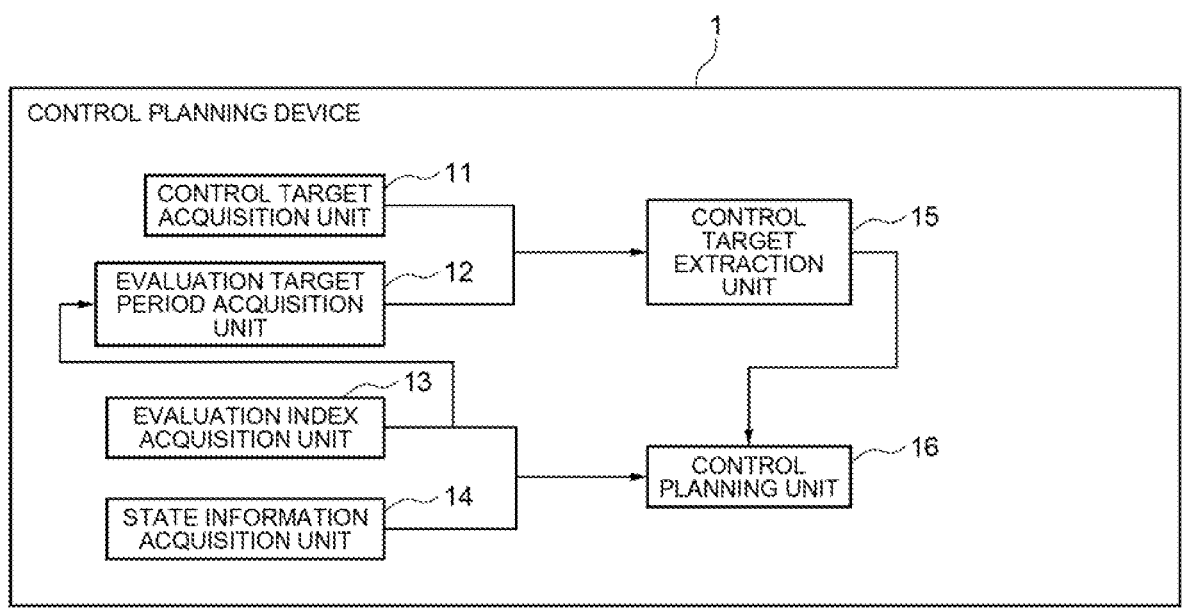
FIG. 1 is a block diagram showing the configuration of a control planning device 1 in a first example embodiment.

FIG. 1 is a block diagram showing the configuration of a control planning device 1 in the first example embodiment of the present invention. The control planning device 1 includes a control target acquisition unit 11, a state information acquisition unit 14, an evaluation index acquisition unit 13, an evaluation target period acquisition unit 12, a control target extraction unit 15, and a control planning unit 16.

The control target acquisition unit 11 acquires control target information including at least a control target that is the target of control planning and a control timing that indicates the control frequency/interval or the like for each control target. A control target includes various judgments of different time scales and influence scopes; for example, an on-site-level judgment such as the allocation of personnel, start/stop of an apparatus, parameter adjustment and the allocation of works, a judgment requiring a judgment at the entire-production-site level such as ordering, personnel shift and presence/absence of overtime work, and a judgment requiring a business judgment such as purchase/repair/disposal of equipment and increase/decrease of personnel. A control timing is categorized into a few seconds to tens of seconds if a short scale, and a quarter to a year if a long scale.

A control timing is determined uniquely for each control target. In a case where a plurality of control timings are defined for one control target, it is assumed that the control timings are defined for different control targets, respectively.

The state information acquisition unit 14 acquires state information, which is information necessary for calculating a control achievement at the time of planning and a control plan. Examples of state information are information which varies in a relatively short time, such as the number of assigned works, the progress of works, the number of remaining works, and the amount of assigned resources including the number of workers and the number of running apparatuses, and information which varies relatively less, such as the total number of workers, the relation between processes, ordering costs, and transportation costs.

The evaluation index acquisition unit 13 acquires evaluation index information of an evaluation target. The evaluation index acquisition unit 13 manually or automatically extracts an evaluation index to be evaluated. An example of a method for manually extracting is that the evaluation index acquisition unit 13 acquires evaluation index information from the user via GUI (Graphical User Interface), voice recognition, or command input. An example of a method for automatically extracting is that the evaluation index acquisition unit 13 sequentially calculates an evaluation value of each evaluation index based on the previous work plan and the updated state information and extracts an evaluation index whose evaluation value does not reach a certain level.

The evaluation index information includes at least an evaluation index that is an evaluation axis for evaluating a control plan and evaluation timing information that indicates a cycle or timing at which the evaluation index is evaluated. Examples of the evaluation index include the progress rate of work, the achievement rate of delivery time, production costs, the number of remaining inventory, and total procurement costs. As will be described later, the control planning device 1 calculates a control plan that maximizes an evaluation index to be evaluated.

The evaluation target period acquisition unit 12 acquires an evaluation target period based on the evaluation timing information included by the evaluation index information acquired by the evaluation index acquisition unit 13. To be specific, the evaluation target period acquisition unit 12 sets a period from the current time to the time when the most recent evaluation is to be performed in the evaluation timing information of the evaluation index as an evaluation target period.

The control target extraction unit 15 extracts, as a first control target, a control target whose control timing is included in the evaluation target period calculated by the evaluation target period acquisition unit 12 from among the control targets acquired by the control target acquisition unit 11.

Figure 2:
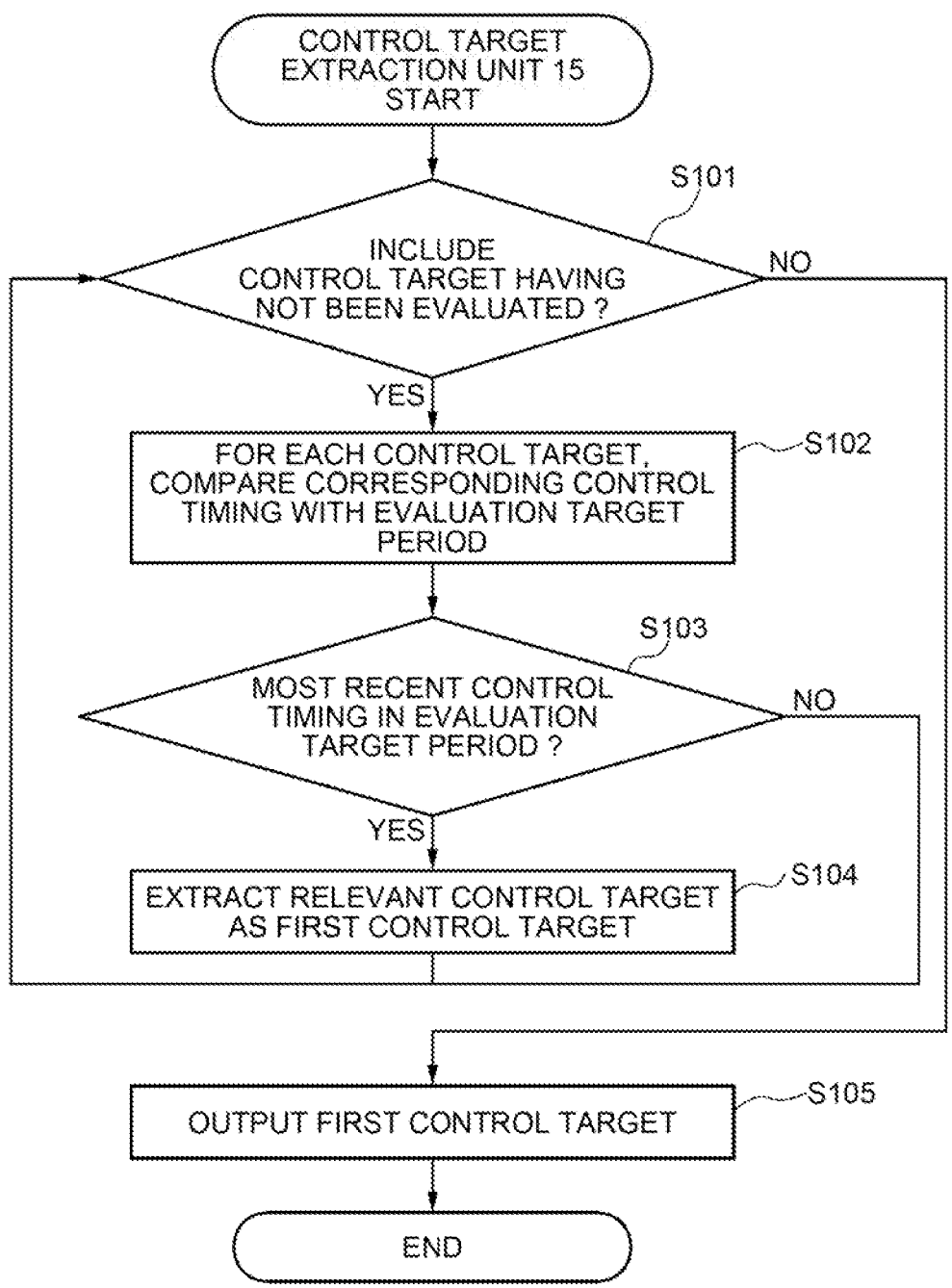
FIG. 2 is a flowchart diagram showing the operation of a control target extraction unit 15 in the first example embodiment.

FIG. 2 is a flowchart diagram showing the operation of the control target extraction unit 15 in the first example embodiment of the present invention. The operation of the control target extraction unit 15 will be described in detail using the drawing.

First, the control target extraction unit 15 confirms whether or not control targets acquired by the control target acquisition unit 11 include control targets having not been evaluated (step S101). If including (step S101, "YES"), the control target extraction unit 15 compares, for each of the control targets having not been evaluated, its corresponding control timing with an evaluation target period (step S102). Then, the control target extraction unit 15 evaluates whether or not the most recent control timing is included in the evaluation target period (step S103) and, if included (step S103, "YES"), extracts the control target as a first control target (step S104). After that, the control target extraction unit 15 returns to step S101. If not included (step S103, "NO"), the control target extraction unit 15 skips step S104 and returns to step S101. Then, when there is no more control target having not been evaluated (step S101, "NO"), the control target extraction unit 15 outputs the first control target and ends the process.

The control planning unit 16 sets the first control target extracted by the control target extraction unit 15 as a control variable and sets the state information acquired by the state information acquisition unit 14 as a constraint condition, and calculates a control plan that maximizes the evaluation index acquired by the evaluation index acquisition unit 13. Examples of a method for calculating the control plan include a method of solving by applying to the optimization problem, a method of trialing a simulation such as ABS (Agent Based Simulation) multiple times and adopting the value of a control variable that most improves the evaluation index, and a method of using a resource management method such as loading or leveling.

With the configuration and operation described above, the control planning device 1 shown in the first example embodiment calculates an evaluation target period that is a time width requiring recalculation, based on an evaluation timing of an evaluation index that should be improved. With this, it is possible to make an evaluation target period agree with a control timing of a control target. Consequently, it is possible to limit the scope of recalculation and reduce the calculation time required for formulating a control plan.

In a case where a plurality of evaluation indexes are acquired, the evaluation target period acquisition unit 12 may set, as the evaluation target period, a period to the farthest time from the current time from among the times when the most recent evaluations of the evaluation indexes are performed, respectively. By employing such a configuration and operation, it is possible to formulate a control plan in consideration of all the evaluation indexes that are desired to be improved.

Second Example Embodiment

Next, a control planning device in a second example embodiment will be described using the drawings. The description of the same configuration and operation as those of the control planning device in the first example embodiment will be omitted.

In the second example embodiment, the operation of the control planning device 1 in the first example embodiment will be described in detail using a production plan in a factory as a case example.

Figure 3:
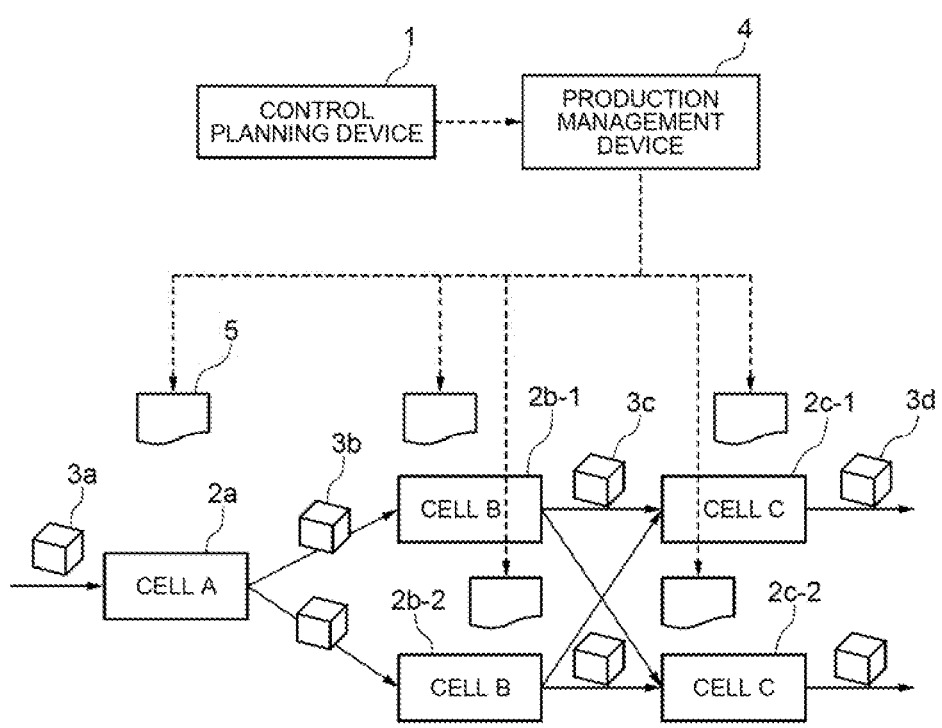
FIG. 3 is a diagram showing the overview of a factory in a second example embodiment.

FIG. 3 is a diagram showing the overview of the factory in the second example embodiment of the present invention. The processes in the factory in this example embodiment include three cells 2 (cells A, B, and C). Of the processes, in the processes of the cells B and C, production can be executed by two cells. A product 3a changes into 3b, 3c, and 3d as it passes through the production process by each cell 2, and the product 3d is in a shipping state. A production instruction 5 is issued to each cell 2 from a production management device 4. At this time, the production management device 4 outputs the production instruction 5 to each cell 2 based on a control plan input from the control planning device 1.

Figure 4:
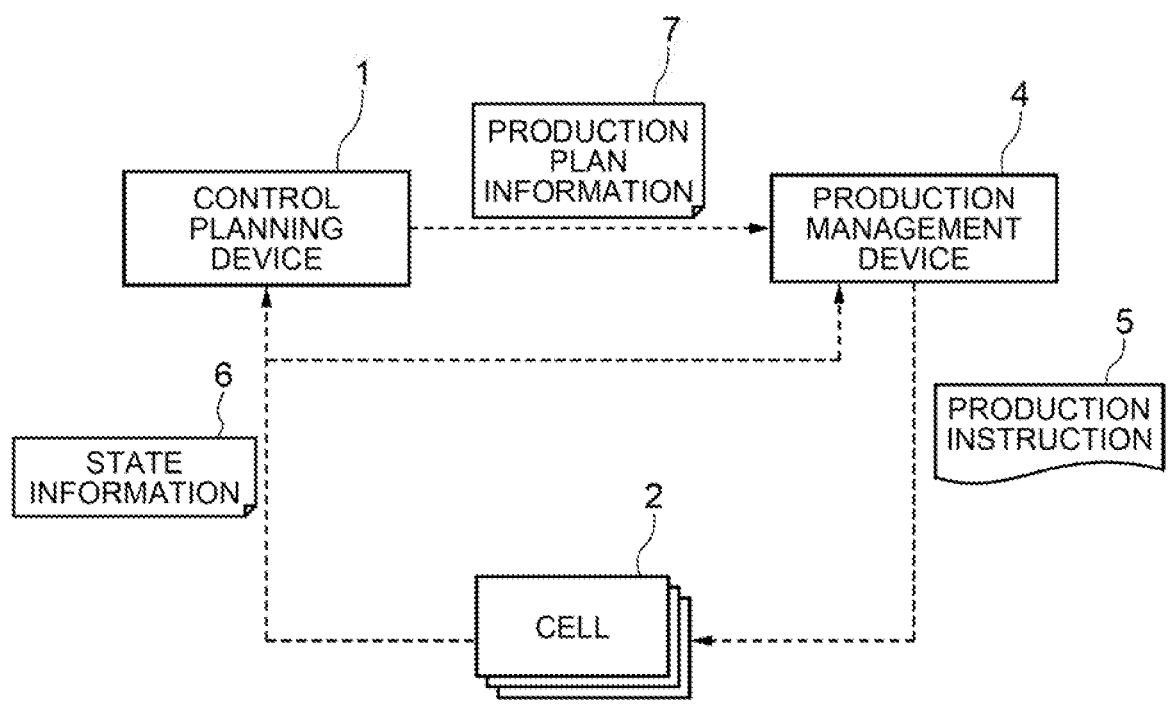
FIG. 4 is a schematic diagram showing the flow of information in the second example embodiment.

FIG. 4 is a schematic diagram showing the flow of information in the second example embodiment of the present invention. From the control planning device 1 to the production management device 4, production plan information 7 is transmitted. Moreover, state information 6 such as start of production and completion of production for each product 3 in each cell 2 is sequentially transmitted to the control planning device 1 and the production management device 4. Then, the production management device 4 sequentially transmits the production instruction 5 to each cell 2 at proper timing based on the received production plan information 7 and state information 6. Furthermore, based on the received state information 6, the control planning device 1 calculates the review/update of the production plan information 7 as necessary, and transmits to the production management device 4. Thus, a production plan and the state of production form a feedback loop structure.

Figure 5:
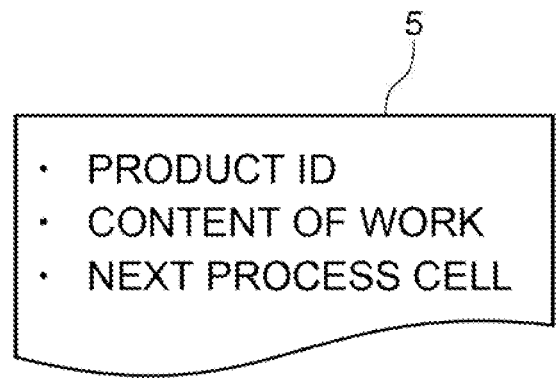
FIG. 5 is a schematic view showing a specific example of a production instruction 5 in the second example embodiment.

FIG. 5 is a schematic view showing a specific example of the production instruction 5 in the second example embodiment of the present invention. For example, the production instruction 5 includes information such as a product ID, the content of a work, and the next process cell. With this, each cell can know a product to produce, the way to produce the product, and a cell to which the product is conveyed after produced.

Figure 6:
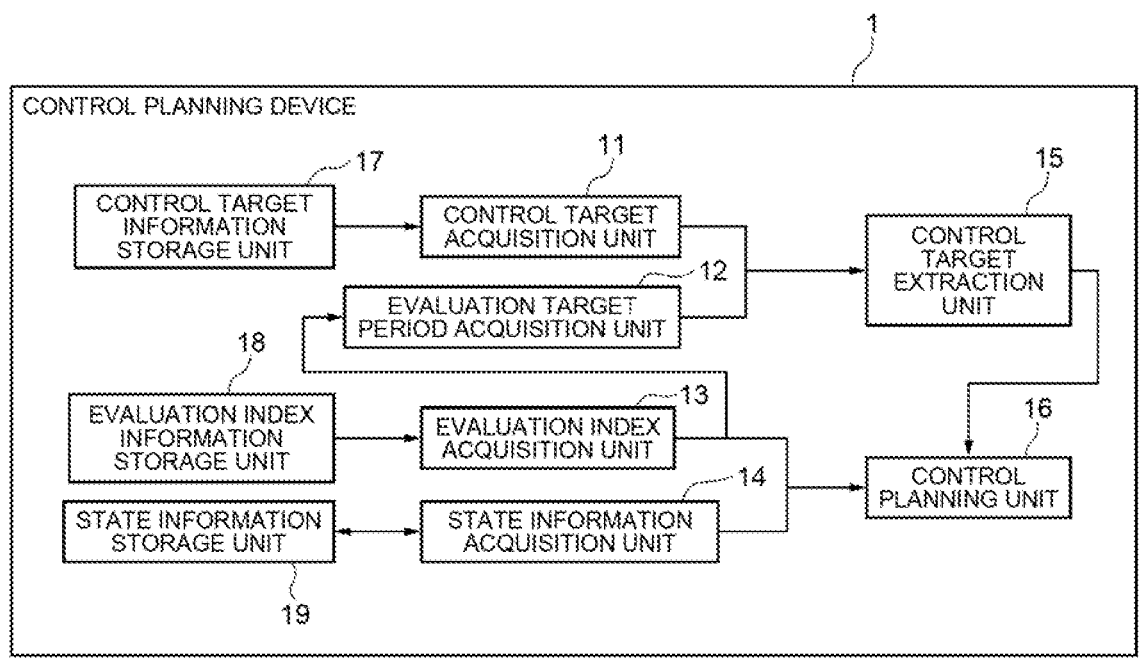
FIG. 6 is a block diagram showing the configuration of a control planning device in the second example embodiment.

Next, the configuration of the control planning device 1 in the second example embodiment of the present invention will be described using the drawing. FIG. 6 is a block diagram showing the configuration of the control planning device in the second example embodiment of the present invention. The difference from the first example embodiment is that the control planning device further includes a control target information storage unit 17, an evaluation index information storage unit 18, and a state information storage unit 19.

The control target information storage unit 17 has a function of storing control target information and providing the stored control target information in response to a request by the control target acquisition unit 11. A specific example of a method for storing is that the control target information storage unit 17 stores control target information in the form of an entry to a database or a file into a storage medium such as HDD (Hard Disk Drive), SSD (Solid State Drive), DRAM (Dynamic Random Access Memory), SD (Secure Digital) memory card, FD (Floppy Disk), or a magnetic tape.

FIG. 7 is an example of storage information in the control target information storage unit 17 in the second example embodiment of the present invention. In this example embodiment, three kinds of control targets including "production assignment change", "worker assignment change", and "part procurement" and control timing information corresponding to each are stored in association with each other. According to FIG. 7, for example, "production assignment change", that is, change of assignment of the production instruction 5 to each cell 2 can be controlled, that is, the policy of assignment can be changed every ten minutes. Likewise, "worker assignment change", that is, assignment of workers to each cell 2 can be changed every hour, and "part procurement", that is, ordering can be changed every day.

The evaluation index information storage unit 18 has a function of storing evaluation index information and providing the stored evaluation index information in response to a request by the evaluation index acquisition unit 13. A specific example of a method for storing is the same method as the storing method by the control target information storage unit 17.

FIG. 8 is an example of storage information in the evaluation index information storage unit 18 in the second example embodiment of the present invention. In this example embodiment, four kinds of evaluation indexes including "work progress rate", "production costs", "number of remaining inventory", and "procurement costs", and evaluation timing information corresponding to each are stored in association with each other. According to FIG. 8, "work progress rate" is evaluated every hour. Likewise, "production costs" is evaluated every day, and "number of remaining inventory" and "procurement costs" are evaluated every week.

The state information storage unit 19 has a function of storing state information sequentially received from the cell 2 by the state information acquisition unit 14, and a function of providing the stored state information in response to a request by the state information acquisition unit 14. A specific example of a method for storing is the same method as the storing method by the control target information storage unit 17 or the evaluation index information storage unit 18.

FIG. 9 is a view showing an example of state information of the respective cells 2 in the second example embodiment of the present invention. According to FIG. 9, a subsequent process of the cell A is branched into cells B1 and B2, and the allocation rate is 50% each. Moreover, the cells B1 and B2 can each select cells C1 and C2 as a subsequent process. Herein, the cell B1 is allocated only to C1, and the cell B2 is allocated only to C2.

Further, regarding the progress rate of work, it can be seen that the progress rate of work of the cell B2 is behind a planned progress rate. Moreover, regarding the cell C2 of the latter stage, it is seen that the progress rate of work is better than the planned progress rate, but the margin is not so large.

It is assumed that the state information shown in FIG. 9 is information updated every hour. Therefore, among the evaluation indexes shown in FIG. 8, the state information regarding "production costs", "number of remaining inventory", and "procurement costs" is omitted.

Next, the operation of the control planning device 1 in the second example embodiment of the present invention will be described in detail using the drawings.

The control planning device 1 in this example embodiment receives update of the state information from the cell 2 at regular intervals, and stores it into the state information storage unit 19. Moreover, the control planning device 1 performs evaluation using the state information based on the evaluation index and the evaluation timing described in the evaluation index information storage unit 18. Then, the control planning device 1 performs the process of recalculation of the control plan. To be specific, the control planning device 1 determines whether or not recalculation of the control plan is necessary based on the result of evaluation, and performs recalculation if necessary.

Figure 10:
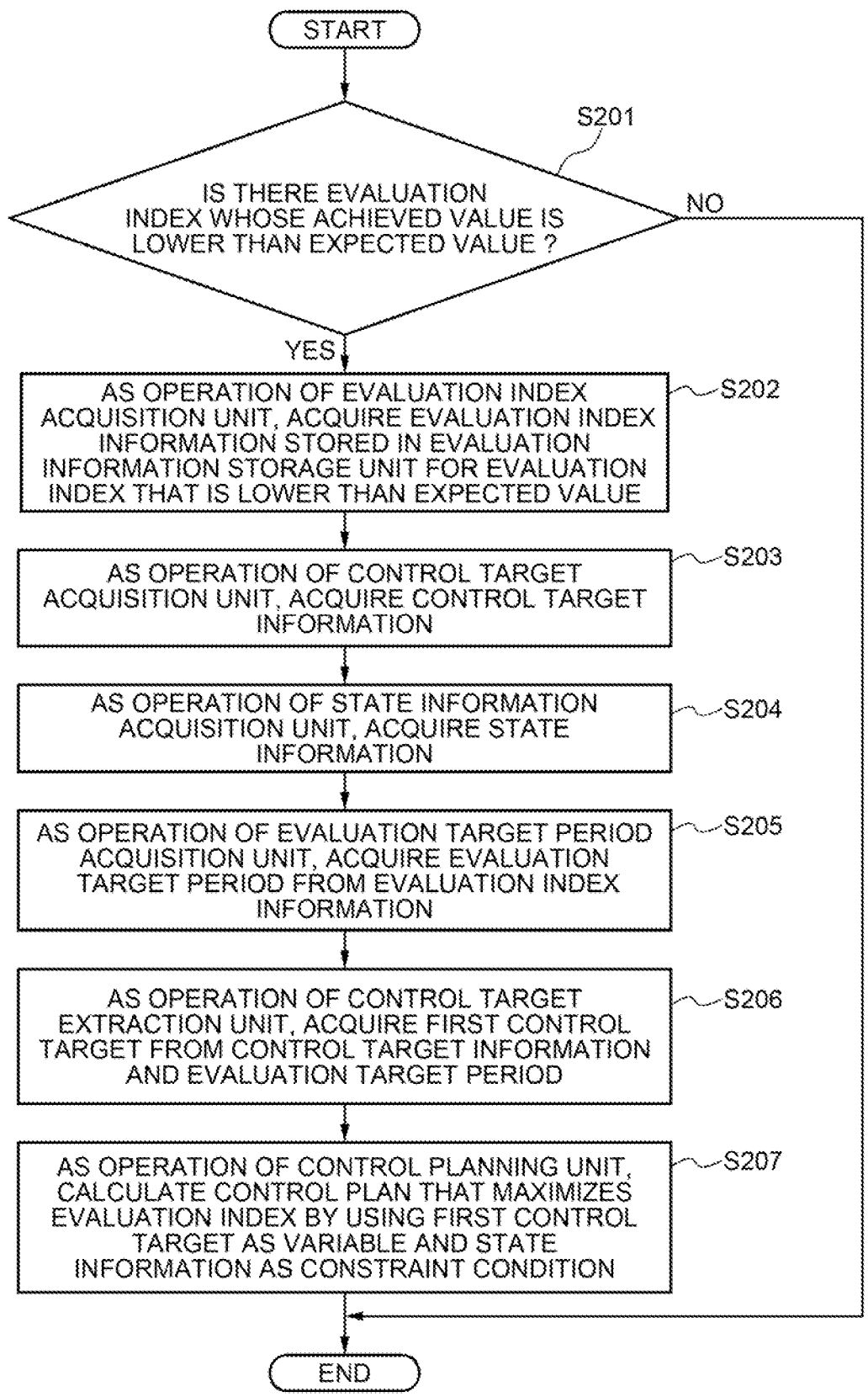
FIG. 10 is a flowchart diagram showing an operation relating to a control plan recalculation process by the control planning device 1 in the second example embodiment.

FIG. 10 is a flowchart diagram showing an operation relating to a control plan recalculation process by the control planning device 1 in the second example embodiment of the present invention. Hereinafter, the operation will be described on the assumption of the control target information shown in FIG. 7, the evaluation target information shown in FIG. 8, and the state information shown in FIG. 9.

First, the control planning device 1 performs confirmation on an evaluation result whether or not there is an evaluation index whose achievement value is lower than an expected value (step S201). When there is no applicable evaluation index (step S201, "NO"), the control planning device 1 considers that the recalculation process is unnecessary, and ends the process.

Herein, of the evaluation indexes shown in FIG. 8, only "work progress rate" is applicable as an evaluation timing. Moreover, in this example embodiment, as an evaluation index regarding the progress rate of work, "1" is given if the progress rate of work of each cell in the state information shown in FIG. 9 satisfies the planned progress rate, and "0" is given if not satisfy. In other words, the evaluation index is maximized when the progress rate of work satisfies the planned progress rater in all the cells.

In this example embodiment, assuming that an expected value represents a "state in which an evaluation value is maximized", it is confirmed whether or not an achieved value is lower than the expected value. Then, it can be confirmed from FIG. 9 that the progress rate of work of the cell B2 (47%) is lower than the planned progress rate (50%). Therefore, the evaluation index of the progress rate of work is in a state in which the achieved value is lower than the expected value.

When there is an applicable evaluation index (step S201, "YES"), subsequently, the evaluation index acquisition unit 13 acquires, for the evaluation index that is lower than the expected value, the evaluation index information stored in the evaluation index information storage unit 18 (step S202). In this example embodiment, the evaluation index acquisition unit 13 acquires "work progress rate" as the evaluation index and "every hour" as the associated evaluation index information.

Next, the control target acquisition unit 11 acquires the control target information (step S203). Herein, the control target acquisition unit 11 acquires all the control target information shown in FIG. 7.

Further, the state information acquisition unit 14 acquires the state information (step S204). Herein, the state information acquisition unit 14 acquires all the state information shown in FIG. 9.

Subsequently, the evaluation target period acquisition unit 12 acquires the evaluation target period from the evaluation index information acquired at step S202 (step S205). In other words, the evaluation target period acquisition unit 12 calculates the evaluation target period based on the acquired evaluation index information. Assuming that the time of the calculation in this example embodiment (the time when the status information is updated) is 13:00, the evaluation timing of "work progress rate" is every hour and hence the next evaluation is to be performed at 14:00. Therefore, the evaluation target period is a period from 13:00 to 14:00.

Next, the control target extraction unit 15 acquires the first control target from the control target information acquired at step S203 and the evaluation target period acquired at step S205 (step S206). Herein, of the control targets, only "production assignment change" is the one whose execution time of the next control is included in the evaluation target period.

Although "worker assignment change" is hourly control and the next control execution time is 14:00, it can be thought that "worker assignment change" is not included in the evaluation target period in consideration of a time until the above control is reflected in the evaluation result. Therefore, herein, "worker assignment change" is not extracted as the first control target.

Then, the control planning unit 16 calculates a control plan that maximizes the evaluation index acquired at step S202 by using the first control target extracted at step S206 as a variable and the state information acquired at step S204 as a constraint condition (step S207).

Herein, a specific example of the method for calculating the control plan will be described using FIG. 11. FIG. 11 is a view describing a method for deriving the control plan in the second example embodiment of the present invention.

The number of assigned works in FIG. 11 is a copy of the number of assigned works in FIG. 9. The number of already assigned works in FIG. 11 is data received from each cell within the state information 6, although corresponding data is not described in FIG. 9. For example, it is shown that in the cell B2, 100 of 150 assigned works have already been assigned. A planned progress rate (14:00) in FIG. 11 is a previously determined planned progress rate at the moment of 14:00. The number of estimated completed works (14:00) in FIG. 11 is the number of works estimated to be completed at the moment of 14:00 in a case where the control plan before recalculation is kept used. An estimated work progress rate before control (14:00) is an estimated work progress rate at the moment of 14:00 in a case where the control plan before recalculation is kept used. The number of assigned works after control is the amount of assigned works based on the control plan after recalculation. An estimated work progress rate after control (14:00) is an estimated work progress rate at the moment of 14:00 in a case where the control plan after recalculation is used. Thus, FIG. 11 illustrates the result of estimating the progress of production in the next one hour and comparing it with the predetermined planned progress rate at the moment of 14:00. Herein, the progress of production in the next one hour is given based on the achievement of production in the most recent one hour. Then, it is found that in the control plan before change, the work progress rate estimated at the moment of 14:00 (57%) does not reach the planned progress rate (65%) only in the cell B2.

Then, the control planning unit 16 calculates subsequent process allocations from the cell A to the cell B1 and to the cell B2, from the cell B1 to the cell C1 and to the cell C2, and from the cell B2 to the cell C1 and to the cell C2 by which the estimated work progress rate at the moment of 14:00 reaches the planned progress rate (14:00) in all the cells. Meanwhile, the number of already assigned works, the planned progress rate at the moment of 14:00, and the number of estimated completed works at the moment of 14:00 are constraint conditions and cannot be changed.

At this time, in order to reach the planned progress rate at the moment of 14:00 (65%) with the number of estimated completed works at the moment of 14:00 (85) in the cell B2, based on

85÷0.65=130.769 . . . , the control planning unit 16 determines that the number of assigned works of the cell B2 should be set to 130 or less. Then, the control planning unit 16 changes the allocation to the subsequent processes from the cell A in order to set the number of assigned works of the cell B2 to 130. At this time, because the number of already assigned works of the cell B2 at the time of calculation (13:00) is 100, the number of works to be flown to the cell B2 among 100 to be produced in the cell A from the current time is narrowed to 30, whereby the cell B2 can achieve the planned progress rate. Then, the control planning unit 16 controls the allocation from the cell A to the subsequent processes so as to be cell B1:cell B2=70:30, whereby it is possible to improve the evaluation of the cell B2.

Subsequently, the control planning unit 16 evaluates whether or not the other cells can also achieve the planned progress rates at the same time when the above control is performed. First, the control planning unit 16 detects a cell to be influenced by the change of allocation to the subsequent processes in the cell A. Herein, the cells B1, C1, and C2 are influenced by the change. Next, the control planning unit 16 evaluates in the following manner whether or not the planned progress rate can be achieved for each of the cells influenced by the change.

In the cell B1, the number of assigned works increases from 150 to 170. Then, the estimated work progress rate after control becomes approximately 68% (=115÷170), which reaches the planned progress rate (65%).

In the cell C1, the number of assigned works also increases from 150 to 170. Then, the estimated work progress rate after control becomes approximately 58% (=100÷170), which reaches the planned progress rate (55%).

In the cell C2, the number of assigned works decreases to 130, and the estimated work progress rate after control becomes approximately 65% (=85÷130), which reaches the planned progress rate (55%).

Thus, by the control planning unit 16, a plan of "changing the distribution of allocations to the subsequent processes in the cell A from 50:50 to 70:30" is derived as a control plan by which the work progress rate after lapse of the evaluation target period reaches the planned progress rate in all the cells.

FIG. 12 is a view showing an example of the state information after control planning in the second example embodiment of the present invention. The underlined numerical values are numerical values having changed before and after control planning. The distribution of allocations from the cell A is changed, and accordingly, the numbers of assigned works of the cells B1, B2, C1, and C2 are changed.

With such a configuration and operation, it is possible to reduce a calculation time required for formulating a control plan. According to the present invention, in recalculation of a control plan, focusing on an evaluation index to be improved and time, a control plan is calculated by using only work assignment to a subsequent process in each cell as a variable. Consequently, it is possible to widely reduce a search range in plan calculation as compared with a case in which multiple kinds of parameters are used as control variables.

Figure 13:
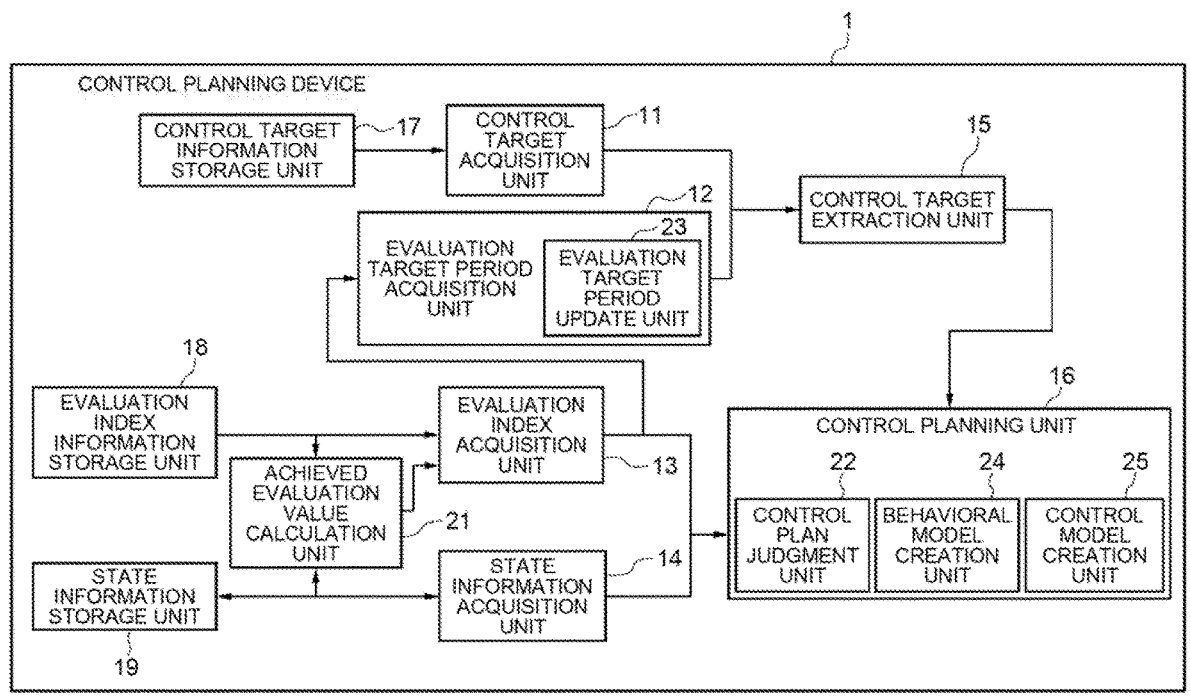
FIG. 13 is a view describing a modified example of the second example embodiment.

In the second example embodiment, an evaluation value for a control achievement is given in advance. Meanwhile, the device may further include an achieved evaluation value calculation unit 21 that calculates an evaluation value for each evaluation index in accordance with its evaluation timing from the state information (refer to FIG. 13), and recalculate a control plan in a case where an achieved evaluation value is lower than a predetermined value. The achieved evaluation value calculation unit 21 sets an evaluation index and evaluation timing included in each evaluation index information stored in the evaluation index information storage unit 18 as an evaluation index candidate to become an evaluation target candidate and an evaluation timing thereof and, based on them and a control achievement in the state information stored in the state information storage unit 19, calculates an evaluation value (an achieved evaluation value) for each evaluation index candidate and outputs the value to the evaluation index acquisition unit 13. The evaluation index acquisition unit 13 determines the evaluation index candidate whose achieved evaluation value is lower than a predetermined value as an evaluation index to be evaluated. Such automatic determination of an evaluation index to be evaluated may be performed in any part of the control planning device 1, for example, by the evaluation target period acquisition unit 12.

With such a configuration and operation, it is possible to automatically calculate an evaluation value for each evaluation index from the state information, and automatically recalculate a control plan based on the result of evaluation. Therefore, it is possible to more speedily reformulate a control plan.

Further, in the second example embodiment, an evaluation index is maximized by setting an appropriate number of assigned works in a sequential process for a cell whose estimated work progress rate is less than a planned progress rate. Meanwhile, a control plan that maximizes an evaluation index may be calculated by solving the optimization problem. More specifically, the control planning unit 16 operates so as to calculate a control plan by solving the optimization problem in which the first control target is a variable, the state information is a constraint condition, and maximization of the evaluation function as an objective function.

Such a configuration and operation makes it possible to utilize an efficient solution search tool such as a solver.

Alternatively, the control planning unit 16 may calculate a control plan by trialing a simulation in which the first control target is a variable and the state information is a constraint condition multiple times and employing a set of variables that make the evaluation index maximum. With such a configuration and operation, it is possible to heuristically obtain a more appropriate plan even for a complicated problem in which formulation into an optimization problem and solution search are difficult. Therefore, it is possible to more efficiently formulate a control plan.

Further, the device may further include a control plan judgment unit 22 that judges the validity of a control plan calculated by the control planning unit 16 (see FIG. 13) and an evaluation target period update unit 23 that updates the evaluation target period so as to be longer in accordance with the evaluation timing based on the result of judgment by the control plan judgment unit 22 (see FIG. 13), and the control target extraction unit 15 and the control planning unit 16 may operate based on the evaluation target period updated by the evaluation target period update unit 23, respectively. In other words, the control plan judgment unit 22 is a control plan evaluation unit that evaluates a control plan calculated by the control planning unit 16.

To be specific, for example, in a case where a control plan calculated with a period from 13:00 to 14:00 as an evaluation target period is judged to be not valid by the control plan judgment unit 22, the evaluation target period update unit 23 operates to update the evaluation target period to a period from 13:00 to 15:00 because the time of execution of the next evaluation is 15:00 in view of the time of the evaluation index "work progress rate" being 14:00. Next, the control target extraction unit 15 again performs extraction of the first control target on the updated evaluation target period. At this time, in addition to "production assignment change", "worker assignment change" is extracted as the first control target. Then, by using production assignment and worker assignment as variables and the state information as a constraint condition, the control planning unit 16 calculates a control plan that maximizes the work progress rate that is the evaluation index.

A specific example of the method for evaluation by the control plan judgment unit 22 is a method of comparing an estimated value of an evaluation index in a control plan with an expected value expected by the control plan and, when the estimated value is higher than the expected value, judging to be valid.

With such a configuration and operation, it is possible to formulate a control plan within a broader search range as necessary while reducing calculation for control planning.

Therefore, it is possible to increase the quality of a control plan while maintaining the efficiency of control plan formulation.

Further, in the second example embodiment, a production achievement in the latest one hour is used as a production prospect in the future one hour in the production operation, and a control plan is formulated using the above as a constraint condition. Meanwhile, a more precise production prospect may be calculated using the state information and used as a constraint condition for formulating a control plan. For example, the device may further include a behavioral model creation unit 24 (see FIG. 13) that creates a behavioral model in the operation based on the state information, and moreover, the control planning unit 16 may operate so as to calculate a control plan by using the behavioral model created by the behavioral model creation unit 24 as a constraint condition.

With such a configuration and operation, it is possible to increase the accuracy of future estimation in a control plan. Therefore, it is possible to increase the quality of a control plan.

Further, in the second example embodiment, an environment in which the rate of work allocation to each cell is immediately reflected is premised. However, in mechanical control or control involving movement, a control instruction is not reflected immediately, but reflected with a transient state and dead time involved. Therefore, the influence of control of a control target on the operation for each time may be taken into consideration. For example, the device may further include a control model creation unit 25 (see FIG. 13) that creates a "control model" representing the influence of control of a control target on the operation, and moreover, the control planning unit 16 may operate so as to calculate a control plan by using the control model as a constraint condition.

Such a configuration and operation makes it possible to formulate a control plan in which a temporal influence of control is taken into consideration. Therefore, it is possible to increase the quality of a control plan.

Although the example embodiments of the present invention have been described above in detail above with reference to the drawings, the specific configuration is not limited to the above, and various design changes and the like without departing from the scope of the present invention are possible.

Further, by recording a program 240 (see FIG. 14) for realizing the whole or part of the functions of the control planning device in the present invention on a computer-readable recording medium, loading the program recorded on the recording medium into a computer system 200 (see FIG. 14), and executing the program, the processes by the respective units may be performed. The "computer system" herein includes OS and hardware such as peripheral equipment.

Figure 14:
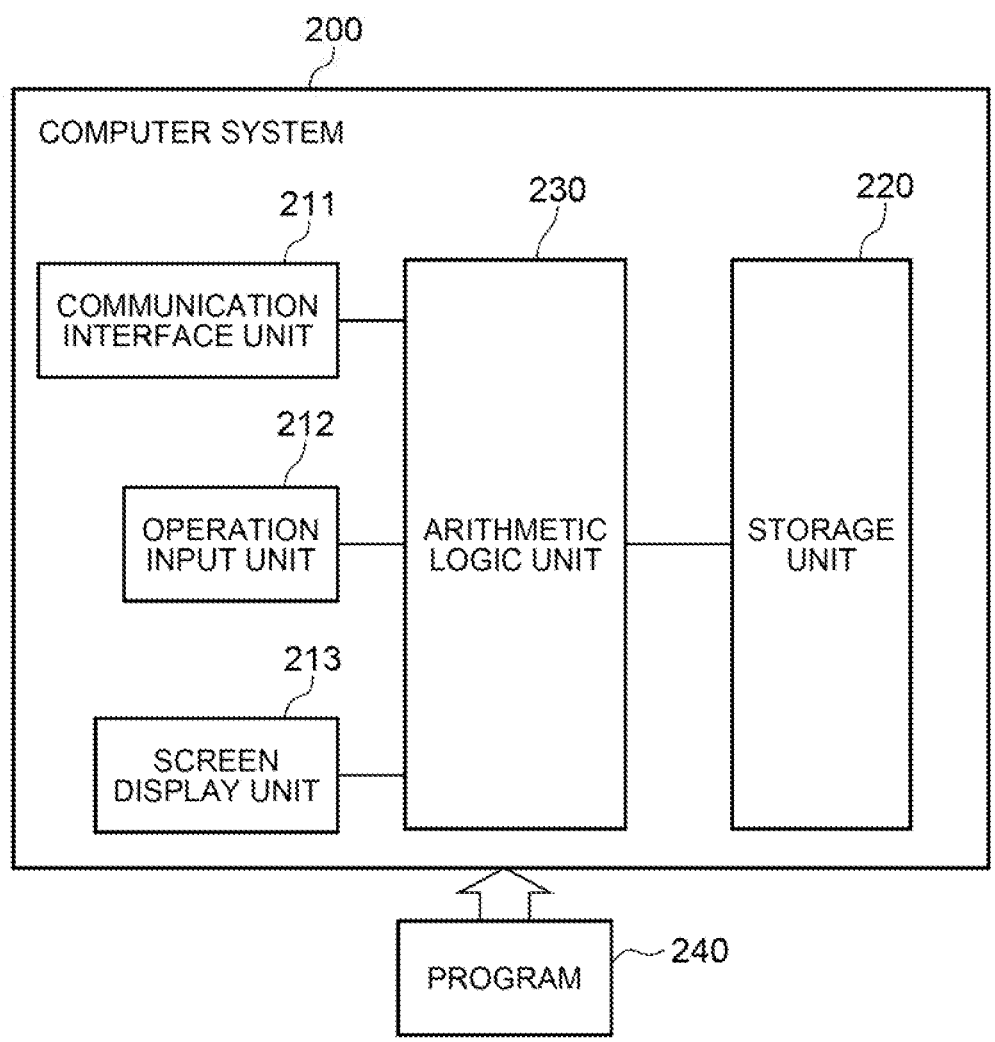
FIG. 14 is a block diagram showing an example of hardware realizing the second example embodiment.

Further, as shown in FIG. 14, the computer system 200 may include a communication interface unit 211, an operation input unit 212, a screen display unit 213, a storage unit 220, and an arithmetic logic unit 230. The communication interface unit 211 includes a dedicated data communication circuit, and is configured to send/receive data to/from external devices such as the cells 2 and the production management device 4 by wireless or wired communication. The operation input unit 212 includes a keyboard, a mouse, or the like, and is configured to detect the operator's operation and transmit it to the arithmetic logic unit 230. The screen display unit 213 includes a screen display device such as an LCD (Liquid Crystal Display) or a PDP (Plasma Display Panel), and is configured to display various information such as an operation menu and production plan information on a screen in accordance with an instruction from the arithmetic logic unit 230. The storage unit 220 includes a memory, a hard disk, or the like, and is configured to store the state information, the evaluation index information, the control target information, and so on. The arithmetic logic unit 230 includes one or more processors such as microprocessors. The program 240 is loaded into the storage unit 220 from an external computer-readable storage medium, for example, when the computer system 200 is started, and controls the operation of the arithmetic logic unit 230 to realize functional units such as the control target acquisition unit 11, the evaluation target period acquisition unit 12, the evaluation index acquisition unit 13, the state information acquisition unit 14, the control target extraction unit 15 and the control planning unit 16 on the arithmetic logic unit 230.

Further, the "computer-readable recording medium" is a portable medium such as a magnetooptical disk, a ROM or a non-volatile semiconductor memory, or a storage device such as a hard disk incorporated in the computer system. Moreover, the "computer-readable recording medium" also include: one that dynamically holds a program for a short time, such as a communication line for transmitting the program through a network such as the Internet or a communication line such as a telephone line; and one that holds a program for a certain period of time, like a volatile memory inside a server or a client computer system in the above case. Moreover, the program may be one that realizes part of the abovementioned functions, or may be one that can realize the abovementioned functions in combination with a program already recorded in a computer system.

Third Example Embodiment

Next, a control planning device in a third example embodiment will be described using the drawing. In the third example embodiment, the overview of the control planning device according to the present invention will be described.

Figure 15:
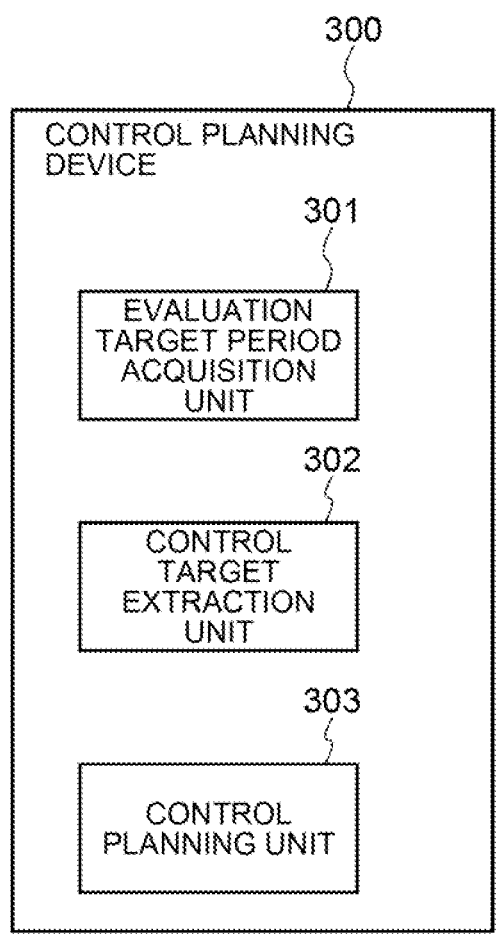
FIG. 15 is a block diagram showing the configuration of a control planning device in a third example embodiment.

Referring to FIG. 15, a control planning device 300 according to this example embodiment includes an evaluation target period acquisition unit 301, a control target extraction unit 302, and a control planning unit 303.

The evaluation target period acquisition unit 301 is configured to acquire an evaluation target period based on an evaluation timing of an evaluation index to be evaluated included by evaluation index information that include the evaluation index and the evaluation timing. The evaluation target period acquisition unit 301 can be configured in the same manner as the evaluation target period acquisition unit 12 shown in FIGS. 1 and 6, but is not limited thereto. The control target extraction unit 302 is configured to extract a control target whose control timing is included in the evaluation target period as a first control target from control target information including at least control targets that are the target of a control plan in an operation and control timings of the respective control targets. The control target extraction unit 302 can be configured in the same manner as the control target extraction unit 15 shown in FIGS. 1 and 6, but is not limited thereto. The control planning unit 303 is configured to calculate a control plan which maximizes an evaluation index to be evaluated by using the first control target as a variable and using state information that is information necessary for calculating a control achievement at the time of planning and a control plan as a constraint condition.

The control planning device 300 thus configured operates in the following manner. That is to say, firstly, the evaluation target period acquisition unit 301 acquires an evaluation target period based on an evaluation timing of an evaluation index to be evaluated included by evaluation index information that include the evaluation index and the evaluation timing. Next, the control target extraction unit 302 extracts a control target whose control timing is included in the evaluation target period as a first control target from control target information including at least control targets that are the target of a control plan in an operation and control timings of the respective control targets. Then, the control planning unit 303 calculates a control plan which maximizes an evaluation index to be evaluated by using the first control target as a variable and using state information that is information necessary for calculating a control achievement at the time of planning and a control plan as a constraint condition.

Thus, according to this example embodiment, it is possible to reduce a time for calculating a work plan by limiting a recalculation target in accordance with an evaluation timing of an evaluation index to be evaluated, that is, an evaluation index to be improved.

Although the present invention has been described above using the example embodiment, the technical scope of the present invention is not limited to the scopes of the example embodiments. It is obvious for one skilled in the art that the example embodiments can be changed or modified in various manners. It is obvious from the scope of the invention that such changed or modified embodiments may also be included within the technical scope of the present invention.

<Supplementary Notes>

The whole or part of the example embodiments disclosed above can be described as, but not limited to, the following supplementary notes.

[Supplementary Note 1]

A control planning device comprising:

an evaluation target period acquiring unit configured to acquire an evaluation target period based on an evaluation timing included by evaluation index information, the evaluation index information including at least an evaluation index to be evaluated and the evaluation timing of the evaluation index;

a control target extracting unit configured to extract a control target whose control timing is included in the evaluation target period as a first control target from control target information, the control target information including at least the control target to be a target of a control plan in an operation and the control timing of each of the control target; and a control planning unit configured to calculate the control plan that maximizes the evaluation index by using the first control target as a variable and using state information as a constraint condition, the state information being information necessary for calculation of a control achievement at a time of planning and the control plan.

[Supplementary Note 2]

The control planning device according to Supplementary Note 1, further comprising a control target acquiring unit configured to acquire the control target information.

[Supplementary Note 3]

The control planning device according to Supplementary Note 1 or 2, further comprising an evaluation index acquiring unit configured to acquire the evaluation index information.

[Supplementary Note 4]

The control planning device according to any of Supplementary Notes 1 to 3, further comprising a state information acquiring unit configured to acquire the state information.

[Supplementary Note 5]

The control planning device according to any of Supplementary Notes 1 to 4, wherein the control planning unit is configured to perform evaluation of the control plan.

[Supplementary Note 6]

The control planning device according to Supplementary Note 5, wherein the evaluation target period acquiring unit is configured to again acquire the evaluation target period that is longer than the evaluation target period based on a result of the evaluation.

[Supplementary Note 7]

The control planning device according to Supplementary Note 6, wherein the control target extracting unit is configured to again extract the control target whose control timing is included in the again acquired evaluation target period, as the first control target from the control target information.

[Supplementary Note 8]

The control planning device according to Supplementary Note 7, wherein the control planning unit is configured to again calculate the control plan that maximizes the evaluation index by using the again extracted first control target as a variable and using the state information as a constraint condition.

[Supplementary Note 9]

The control planning device according to any of Supplementary Notes 1 to 8, wherein the evaluation target period acquiring unit is configured to, in a case where there are a plurality of evaluation indexes, from among times to execute most recent evaluations of the respective evaluation indexes, set a period up to farthest time from current time as the evaluation target period.

[Supplementary Note 10]

The control planning device according to any of Supplementary Notes 1 to 9, wherein the evaluation target period acquiring unit is configured to calculate an evaluation value for each evaluation index candidate based on an evaluation timing included by evaluation index candidate information and the control achievement, the evaluation index candidate information including at least an evaluation index candidate to be a candidate of the evaluation index and the evaluation timing of the evaluation index candidate.

[Supplementary Note 11]

The control planning device according to Supplementary Note 10, wherein the evaluation target period acquiring unit is configured to acquire the evaluation index to be evaluated from the evaluation index candidate based on the evaluation value.

[Supplementary Note 12]

The control planning device according to any of Supplementary Notes 1 to 11, wherein the control planning unit is configured to create a behavioral model in the operation based on the state information.

[Supplementary Note 13]

The control planning device according to Supplementary Notes 12, wherein the control planning unit is configured to add the behavioral model as the constraint condition and calculate the control plan.

[Supplementary Note 14]

The control planning device according to any of Supplementary Notes 1 to 13, wherein the control planning unit is configured to create a control model representing an influence on the operation by control on the control target.

[Supplementary Note 15]

The control planning device according to Supplementary Note 14, wherein the control planning unit is configured to add the control model as the constraint condition and calculate the control plan.

[Supplementary Note 16]

The control planning device according to any of Supplementary Notes 1 to 15, wherein the control planning unit is configured to calculate the control plan by solving an optimization problem in which the first control target is a variable, the state information is a constraint condition, and maximization of the evaluation index is an objective function.

[Supplementary Note 17]

The control planning device according to any of Supplementary Notes 1 to 16, wherein the control planning unit is configured to calculate the control plan by trialing multiple times a simulation with the first control target as a variable and the state information as a constraint condition and employing a set of variables that maximize the evaluation index.

[Supplementary Note 18]

A control planning system comprising:

an evaluation target period acquiring unit configured to acquire an evaluation target period based on an evaluation timing included by evaluation index information, the evaluation index information including at least an evaluation index to be evaluated and the evaluation timing of the evaluation index;

a control target extracting unit configured to extract a control target whose control timing is included in the evaluation target period as a first control target from control target information, the control target information including at least the control target to be a target of a control plan in an operation and the control timing of each of the control target; and a control planning unit configured to calculate the control plan that maximizes the evaluation index by using the first control target as a variable and using state information as a constraint condition, the state information being information necessary for calculation of a control achievement at a time of planning and the control plan.

[Supplementary Note 19]

A control planning method comprising:

acquiring an evaluation target period based on an evaluation timing included by evaluation index information, the evaluation index information including at least an evaluation index to be evaluated and the evaluation timing of the evaluation index;

extracting a control target whose control timing is included in the evaluation target period as a first control target from control target information, the control target information including at least the control target to be a target of a control plan in an operation and the control timing of each of the control target; and calculating the control plan that maximizes the evaluation index by using the first control target as a variable and using state information as a constraint condition, the state information being information necessary for calculation of a control achievement at a time of planning and the control plan.

[Supplementary Note 20]

A non-transitory computer-readable recording medium having a program recorded thereon, the program comprising instructions for causing a computer to function as:

an evaluation target period acquiring unit configured to acquire an evaluation target period based on an evaluation timing included by evaluation index information, the evaluation index information including at least an evaluation index to be evaluated and the evaluation timing of the evaluation index;

a control target extracting unit configured to extract a control target whose control timing is included in the evaluation target period as a first control target from control target information, the control target information including at least the control target to be a target of a control plan in an operation and the control timing of each of the control target; and a control planning unit configured to calculate the control plan that maximizes the evaluation index by using the first control target as a variable and using state information as a constraint condition, the state information being information necessary for calculation of a control achievement at a time of planning and the control plan.

[Supplementary Note 21]

A control planning device calculating a control plan in an operation, the control planning device comprising:

a control target acquiring unit configured to acquire control target information including at least a control target to be a target of the control plan and a control timing of each of the control target;

a state information acquiring unit configured to acquire state information that is information necessary for calculation of a control achievement at a time of planning and the control plan;

an evaluation index acquiring unit configured to acquire evaluation index information including at least an evaluation index to be evaluated and an evaluation timing of the evaluation index;

an evaluation target period acquiring unit configured to acquire an evaluation target period based on the evaluation timing included by the evaluation index information;

a control target extracting unit configured to extract the control target whose control timing is included in the evaluation target period as a first control target; and a control planning unit configured to calculate the control plan that maximizes the evaluation index by using the first control target as a variable and using the state information as a constraint condition.

[Supplementary Note 22]

The control planning device according to Supplementary Note 21, further comprising: a control plan evaluating unit configured to perform evaluation of the control plan calculated by the control planning unit; and an evaluation target period updating unit configured to update the evaluation target period so as to elongate based on the evaluation timing, judging from a result of the evaluation by the control plan evaluating unit, wherein the control target extracting unit and the control planning unit are configured to operate based on the evaluation target period updated by the evaluation target period updating unit, respectively.

[Supplementary Note 23]

The control planning device according to Supplementary Note 21 or 22, wherein the evaluation target period acquiring unit is configured to, in a case where a plurality of evaluation indexes are acquired, from among times to execute most recent evaluations of the respective evaluation indexes, set a period up to farthest time from current time as the evaluation target period.

[Supplementary Note 24]

The control planning device according to any of Supplementary Notes 21 to 23, further comprising an achieved evaluation value calculating unit configured to calculate an achieved evaluation value from the state information at regular intervals, wherein the control plan is recalculated when the achieved evaluation value is lower than a predetermined value.

[Supplementary Note 25]

The control planning device according to any of Supplementary Notes 21 to 24, further comprising a behavioral model creating unit configured to create a behavioral model in the operation, wherein the control planning unit is configured to additionally use the behavioral model as a constraint condition and calculate the control plan.

[Supplementary Note 26]

The control planning device according to any of Supplementary Notes 21 to 25, further comprising a control model creating unit configured to create a control model representing an influence on the operation by control on the control target, wherein the control planning unit is configured to additionally use the control model as a constraint condition and calculate the control plan.

[Supplementary Note 27]

The control planning device according to any of Supplementary Notes 21 to 26, wherein the control planning unit is configured to calculate the control plan by solving an optimization problem in which the first control target is a variable, the state information is a constraint condition, and maximization of the evaluation index is an objective function.

[Supplementary Note 28]

The control planning device according to any of Supplementary Notes 21 to 27, wherein the control planning unit is configured to calculate the control plan by trialing multiple times a simulation with the first control target as a variable and the state information as a constraint condition and employing a set of variables that maximize the evaluation index.

[Supplementary Note 29]

A control planning system calculating a control plan in an operation, the control planning system comprising:

a control target acquiring unit configured to acquire control target information including at least a control target to be a target of the control plan and a control timing of each of the control target;

a state information acquiring unit configured to acquire state information that is information necessary for calculation of a control achievement at a time of planning and the control plan;

an evaluation index acquiring unit configured to acquire evaluation index information including at least an evaluation index to be evaluated and an evaluation timing of the evaluation index;

an evaluation target period acquiring unit configured to acquire an evaluation target period based on the evaluation timing included by the evaluation index information;

a control target extracting unit configured to extract the control target whose control timing is included in the evaluation target period as a first control target; and a control planning unit configured to calculate the control plan that maximizes the evaluation index by using the first control target as a variable and using the state information as a constraint condition.

[Supplementary Note 30]

A control planning method for calculating a control plan in an operation, the control planning method comprising:

acquiring control target information including at least a control target to be a target of the control plan and a control timing of each of the control target;

acquiring state information that is information necessary for calculation of a control achievement at a time of planning and the control plan;

acquiring evaluation index information including at least an evaluation index to be evaluated and an evaluation timing of the evaluation index;

acquiring an evaluation target period based on the evaluation timing included by the evaluation index information;

extracting the control target whose control timing is included in the evaluation target period as a first control target; and calculating the control plan that maximizes the evaluation index by using the first control target as a variable and using the state information as a constraint condition.

[Supplementary Note 31]

A non-transitory computer-readable recording medium having a control planning program for calculating a control plan in an operation stored thereon, the control planning program comprising instructions for causing a computer to execute:

a control target acquiring process to acquire control target information including at least a control target to be a target of the control plan and a control timing of each of the control target;

a state information acquiring process to acquire state information that is information necessary for calculation of a control achievement at a time of planning and the control plan;

an evaluation index acquiring process to acquire evaluation index information including at least an evaluation index to be evaluated and an evaluation timing of the evaluation index;

an evaluation target period acquiring process to acquire an evaluation target period based on the evaluation timing included by the evaluation index information;

a control target extracting process to extract the control target whose control timing is included in the evaluation target period as a first control target; and a control planning process to calculate the control plan that maximizes the evaluation index by using the first control target as a variable and using the state information as a constraint condition.

DESCRIPTION OF NUMERALS 1 control planning device
2 cell
3 product
4 production management device
5 production instruction
6 state information
7 production plan information
11 control target acquisition unit
12 evaluation target period acquisition unit
13 evaluation index acquisition unit
14 state information acquisition unit
15 control target extraction unit
16 control planning unit
17 control target information storage unit
18 evaluation index information storage unit
19 state information storage unit
21 achieved evaluation value calculation unit
22 control plan judgment unit
23 evaluation target period update unit
24 behavioral model creation unit
25 control model creation unit
200 computer system
211 communication interface unit
212 operation input unit
213 screen display unit
220 storage unit
230 arithmetic logic unit
240 program
300 control planning device
301 evaluation target period acquisition unit
302 control target extraction unit
303 control planning unit

The invention claimed is:

1. A control planning device comprising:
an evaluation target period acquiring unit configured to acquire an evaluation target period based on an evaluation timing of an evaluation index to be evaluated via evaluation index information including at least the evaluation index to be evaluated and the evaluation timing of the evaluation index;
a first storage medium configured to store control target information including a plurality of control targets and control timing of each of the plurality of control targets, the plurality of control targets including a target of a control plan in an operation;
a control target extracting unit configured to extract, of the plurality of control targets, a selected control target of which the control timing is included in the evaluation target period as a first control target from the control target information; and
a control planning unit configured to calculate the control plan to maximize the evaluation index by using the first control target as a variable and using state information as a constraint condition, the state information being information necessary for calculation of a control achievement at a time of planning and the control plan, and control the first control target according to the calculated control plan.

2. The control planning device according to claim 1, further comprising a control target acquiring unit configured to acquire the control target information.

3. The control planning device according to claim 1, further comprising an evaluation index acquiring unit configured to acquire the evaluation index information.

4. The control planning device according to claim 1, further comprising a state information acquiring unit configured to acquire the state information.

5. The control planning device according to claim 1, wherein the control planning unit is configured to perform evaluation of the control plan.

6. The control planning device according to claim 5, wherein the evaluation target period acquiring unit is configured to again acquire the evaluation target period that is longer than the evaluation target period based on a result of the evaluation.

7. The control planning device according to claim 6, wherein the control target extracting unit is configured to again extract, of the plurality of control targets, the selected control target of which the control timing is included in the evaluation target period as acquired again, as the first control target, from the control target information.

8. The control planning device according to claim 7, wherein the control planning unit is configured to again calculate the control plan to maximize the evaluation index by using the first control target as extracted again as the variable and using the state information as the constraint condition.

9. The control planning device according to claim 1, wherein the evaluation target period acquiring unit is configured to, in a case where the evaluation index is one of a plurality of evaluation indexes, from among times to execute most recent evaluations of respective of the evaluation indexes, set a period up to a farthest time from a current time as the evaluation target period.

10. The control planning device according to claim 1, wherein the evaluation target period acquiring unit is configured to calculate an evaluation value for each of a plurality of evaluation index candidates based on an evaluation candidate timing of a respective one of the each of the plurality of evaluation index candidates via the control achievement and evaluation index candidate information including at least the evaluation index candidates as candidates of the evaluation index and the evaluation candidate timing of the each of the plurality of evaluation index candidates.

11. The control planning device according to claim 10, wherein the evaluation target period acquiring unit is configured to acquire the evaluation index to be evaluated from the evaluation index candidates based on the evaluation value for each of the plurality of evaluation index candidates.

12. The control planning device according to claim 1, wherein the control planning unit is configured to create a behavioral model in the operation based on the state information.

13. The control planning device according to claim 12, wherein the control planning unit is configured to add the behavioral model as the constraint condition and calculate the control plan.

14. The control planning device according to claim 1, wherein the control planning unit is configured to create a control model representing an influence on the operation by control on the selected control target.

15. The control planning device according to claim 14, wherein the control planning unit is configured to add the control model as the constraint condition and calculate the control plan.

16. The control planning device according to claim 1, wherein the control planning unit is configured to calculate the control plan by solving an optimization problem in which the first control target is a variable, the state information is the constraint condition, and maximization of the evaluation index is an objective function.

17. The control planning device according to claim 1, wherein the control planning unit is configured to calculate the control plan by trialing multiple times a simulation with the first control target as the variable, as one of a set of variables, and the state information as the constraint condition and employing the set of variables that maximize the evaluation index.

18. The control planning device according to claim 1, further comprising:
a second storage medium configured to store the evaluation index information in advance.

19. A control planning method comprising:
acquiring an evaluation target period based on an evaluation timing of an evaluation index to be evaluated via evaluation index information including at least the evaluation index to be evaluated and the evaluation timing of the evaluation index;
storing control target information including a plurality of control targets and control timing of each of the plurality of control targets, the plurality of control targets including a target of a control plan in an operation;
extracting, of the plurality of control targets, a selected control target of which the control timing is included in the evaluation target period as a first control target from the control target information; and
calculating the control plan to maximize the evaluation index by using the first control target as a variable and using state information as a constraint condition, the state information being information necessary for calculation of a control achievement at a time of planning and the control plan, and controlling the first control target according to the calculated control plan.

20. A non-transitory computer-readable recording medium having a program recorded thereon, the program comprising instructions for causing a computer to function as:
an evaluation target period acquiring unit configured to acquire an evaluation target period based on an evaluation timing of an evaluation index via evaluation index information including at least the evaluation index to be evaluated and the evaluation timing of the evaluation index;
a first storing unit configured to store control target information including a plurality of control targets and control timing of each of the plurality of control targets, the plurality of control targets including a target of a control plan in an operation;
a control target extracting unit configured to extract, of the plurality of control targets, a selected control target of which the control timing is included in the evaluation target period as a first control target from the control target information; and
a control planning unit configured to calculate the control plan to maximize the evaluation index by using the first control target as a variable and using state information as a constraint condition, the state information being information necessary for calculation of a control achievement at a time of planning and the control plan, and control the first control target according to the calculated control plan.

* * * * *